United States Patent [19]

Gordon et al.

[11] Patent Number: 4,834,599

[45] Date of Patent: May 30, 1989

[54] TRUCK BED DIVIDER

[76] Inventors: Larry T. Gordon, 5701 Clinton Rd., Jackson, Mich. 49201; George Spector, 233 Broadway RM 3815, New York, N.Y. 10007

[21] Appl. No.: 114,430

[22] Filed: Oct. 29, 1987

[51] Int. Cl.⁴ .......................... B60P 7/08; B61D 45/00
[52] U.S. Cl. .................................................... 410/151
[58] Field of Search ............... 410/121, 143, 151, 145, 410/146, 147, 148, 149; 403/43, 45, 118, DIG. 7; 285/298, 302; 211/105.4, 123

[56] References Cited

U.S. PATENT DOCUMENTS

| 793,414 | 5/1905 | Callanan | 285/302 X |
| 2,184,358 | 12/1939 | Moore | 285/302 |
| 2,512,082 | 6/1950 | Bainbridge et al. | 285/302 X |
| 2,661,850 | 12/1953 | Fowler et al. | 211/105.4 |
| 4,737,056 | 4/1988 | Hunt | 410/151 |

FOREIGN PATENT DOCUMENTS

| 433625 | 9/1967 | Switzerland | 403/43 |
| 17227 | 8/1905 | United Kingdom | 211/123 |

OTHER PUBLICATIONS

Waldes Truarc Retaining Rings, Circa 1943.

Primary Examiner—Robert B. Reeves
Assistant Examiner—Frank H. Williams Jr.

[57] ABSTRACT

A truck bed divider is provided and consists of two arm members extending axially outwardly from a connector in which each of the arm members has a suction cup on outer end to engage with sidewalls of a rear deck of a pickup truck to restrain cargo therein.

1 Claim, 1 Drawing Sheet

TRUCK BED DIVIDER

BACKGROUND OF THE INVENTION

The instant invention relates generally to cargo braces and more specifically it relates to a truck bed divider.

Numerous cargo braces have been provided in prior art that are adapted to be installed in beds of a pickup trucks to restrain cargo from movement during transit. For example, U.S. Pat. Nos. 3,110,506; 3,880,394 and 4,343,578 all are illustrative of such prior art. While these units may be suitable for the particular purpose to which they address, they would not be as suitable for the purposes of the present invention as heretofore described.

SUMMARY OF THE INVENTION

A primary object of the present invention is to provide a truck bed divider that will overcome the shortcomings of the prior art devices.

Another object is to provide a truck bed divider that has two arm members extending outwardly from a connector in which each of the arm members has a suction cup on distal end to engage with side walls of the truck bed so as to restrain cargo therein.

An additional object is to provide a truck bed divider that is adjustable to fit truck beds of both large and small pickup trucks and will not damage the sidewalls of the truck bed.

A further object is to provide a truck bed divider that is simple and easy to use.

A still further object is to provide a truck bed divider that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

DETAILED DESCRIPTION OF THE PREFERRED EMBODIMENTS

Figure 1:
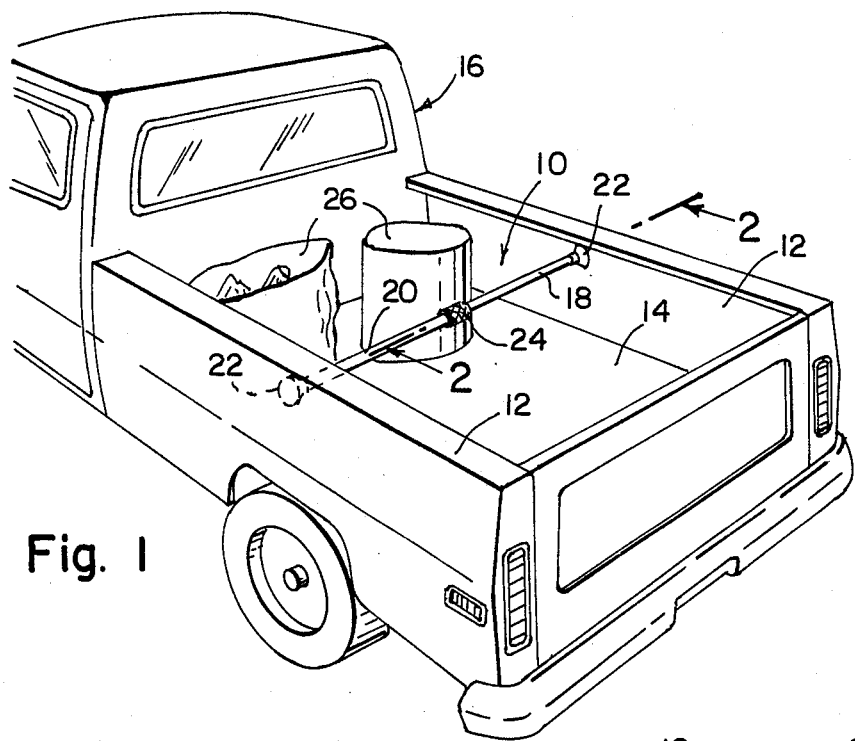
FIG. 1 is a perspective view of a pickup truck with the invention installed therein.
Figure 2:
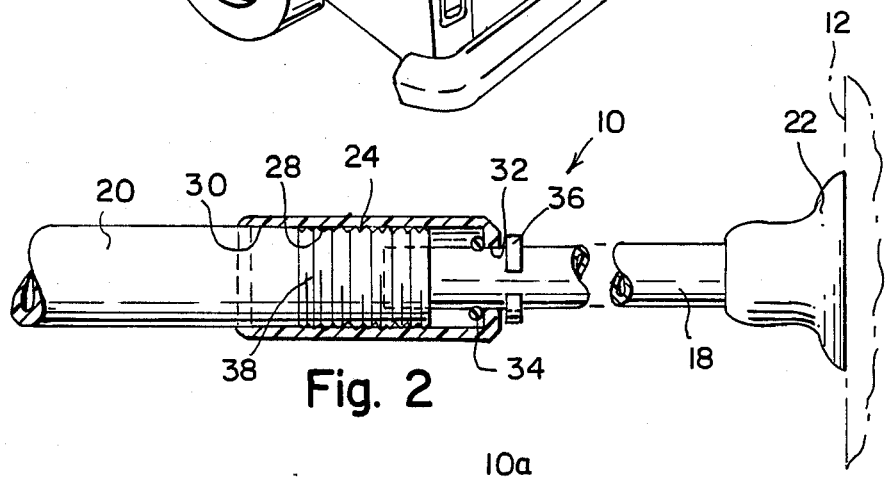
FIG. 2 is an enlarged cross sectional view taken along line 2—2 in FIG. 1 showing the internal structure in greater detail.

Turning now descriptively to the drawings, in which similar reference characters denote similar elements throughout the several views, FIGS. 1 and 2 illustrate a truck bed divider 10 for engagement with opposite sidewalls 12 of a rear deck 14 of a pickup truck 16. The divider 10 consists of first and second tubular arm members 18 and 20. A pair of sidewall gripping members 22, which are suction cups, are each secured to outer end of each of the arm members 18 and 20. A connector 24 is provided to capture each inner end of the arm members 18 and 20 for adjustment thereof, so that the arm members 18 and 20 will extend axially outwardly with each of the sidewall gripping members 22 bearing against one of the sidewalls 12 of the rear deck 14 of the pickup truck 16 to hold cargo 26 stationary within the rear deck 14 of th pickup truck 16.

As best seen in FIG. 2, the first arm member 18 is smaller in diameter than the second arm member 20 so that the first and second arm members 18 and 20 can be coupled in mutually telescoping engagement. The connector 24 is hollow and has internal threads 28 therein. A large opening 30 is at one end and a small opening 32 is at other end. A retainer ring 34 fits over the inner end of the first arm member 18 before the first arm member is placed into the small opening 32 of the connector 24. A split ring 36 is placed around the first arm member 18 near the small opening 32 of the comnnector 24 to hold the connector onto the first arm member 18 and allows the connector 24 to turn thereon. The second arm member 20 has external threads 38 on the inner end to thread into the large opening 30 of the connector 24 whereby turning of the connector will adjust the arm members 18 and 20.

Figure 3:
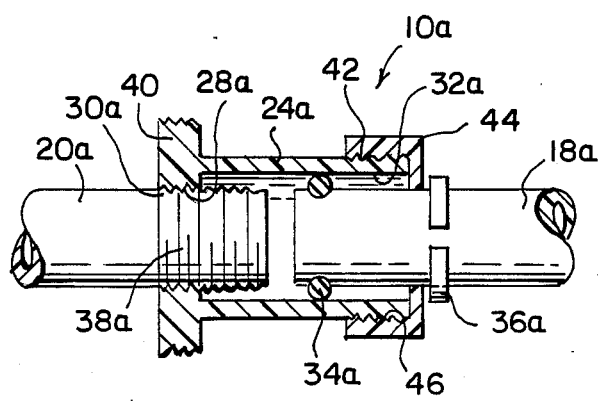
FIG. 3 is an enlarged cross sectional view of a modification of the connector whereby same diameter arm members can be utilized instead of different sized ones shown in FIG. 2.

FIG. 3 shows a modified divider 10a in which the first arm member 18a is of the same diameter as the second arm member 20a. The connector 24a is hollow and has a flange 40 with internal threads 28a at one open end 30a and external threads 42 at other open end 32a. A retainer ring 34a fits over the inner end of the first arm member 18a before the first arm member is placed into the external threaded open end 32a of the connector 24a. A cap 44 that has internal threads 46 fits over the first arm member 18a to extend up near to the retainer rings 34a. The cap 44 threads onto the external threads 42 of the open end 32a of the connector 24a. A split clutch rings 36a is placed around the first arm member 18a near the cap 44 to hold the cap onto the first arm member 18a and allows the cap 44 with the connector 24a to turn thereon. The second arm member 20a has external threads 38a on the inner end to thread onto the internal threads 28a of the open end 30a of the connector 24a whereby turning of the connector 24a will adjust the arm members 18a and 20a.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. A truck bed divider for engagement with opposite sidewalls of a rear deck of a pickup truck, said divider comprising:
    (a) a first and second tubular arm members;
    (b) a pair of sidewall gripping members each secured to an outer end of each of said arm members;
    (c) a connector to capture each inner end of said arm members for adjustment thereof so that said arm members will extend axially outwardly with each of said sidewall gripping members bearing against one of the sidewalls of the rear deck of the pickup truck to hold cargo stationary within the rear deck of the pickup truck, wherein each of said sidewall gripping members is a suction cup secured to outer end of one of said arm members, wherein said connector is swivelled on said first arm for relative rotation therewith and said connector is threadedly connected to said arm;

(d) said connector being hollow, having a flange at one end and internal threads adjacent the other end;

(e) a retainer ring mounted on the inner end of said first arm member and a split ring spaced from said retainer on said first arm member for swivelly retaining said flange and wherein said arm members are of equal diameter and wherein said flange is formed by a cap threadedly mounted on said connector, said cap having an inwardly disposed flange.

* * * * *